United States Patent [19]

Fukasawa et al.

[11] Patent Number: 5,932,030
[45] Date of Patent: *Aug. 3, 1999

[54] FLUX FOR SOLDERING USING SOLDER PREFORMS

[75] Inventors: Hiroyuki Fukasawa, Tama; Yuji Kawamata, Tochigi-ken, both of Japan

[73] Assignees: Sony Corporation; Senju Metal Industry Co., Ltd., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/640,125

[22] Filed: Apr. 30, 1996

[30] Foreign Application Priority Data

Jun. 19, 1995 [JP] Japan .................................. 7-151426

[51] Int. Cl.$^6$ .................................................. B23K 35/36
[52] U.S. Cl. ................................ 148/23; 148/22; 148/24; 148/25; 228/207; 228/223
[58] Field of Search ................................ 148/22, 23, 24, 148/25; 228/207, 223

[56] References Cited

U.S. PATENT DOCUMENTS

| 3,139,360 | 6/1964 | Voida ........................................ 148/23 |
| 3,963,529 | 6/1976 | Tsunashima ............................... 148/25 |
| 4,218,248 | 8/1980 | Snyder et al. ......................... 106/1.12 |
| 4,670,298 | 6/1987 | Lucas et al. .............................. 427/96 |
| 5,004,509 | 4/1991 | Bristol ...................................... 148/23 |
| 5,129,962 | 7/1992 | Gutierrez et al. ........................ 148/23 |
| 5,376,403 | 12/1994 | Capote et al. ............................ 427/96 |
| 5,417,771 | 5/1995 | Arita et al. ............................... 148/23 |
| 5,452,840 | 9/1995 | Turner ................................... 228/180.1 |
| 5,558,109 | 9/1996 | Cala et al. ................................ 134/42 |

FOREIGN PATENT DOCUMENTS

| 2124 015 | 6/1972 | Germany . |
| WO86/05428 | 9/1986 | WIPO . |

OTHER PUBLICATIONS

Manko, H.H., "Solders and Soldering: Materials, Design, Production, and Analysis for Reliable Bonding", Ch. 10, "Paste and Preforms", McGraw–Hill, Inc. pp. 408–439. (no month given), 1992.
Manko: Solders & Soldering Chapt #10.
Derwent WPI Abstract (English) of WO 8605428 dated Sep. 25, 1986.
Patent Abstracts of Japan, vol. 16, No. 40, Apr. 8, 1992, of JP 04 000393 dated Jan. 6, 1992.
Patent Abstracts of Japan, vol. 16, No. 273, Jun. 18, 1992, of JP 04 068095 dated Mar. 3, 1992.

*Primary Examiner*—Patrick Ryan
*Assistant Examiner*—M. Alexandra Elve
*Attorney, Agent, or Firm*—Sughrue, Mion, Zinn, Macpeak & Seas, PLLC

[57] ABSTRACT

A flux composition for use together with solder preforms, which comprises rosin, N-unsubstituted or N-substituted 2-pyrrolidone, and optionally a high boiling point ester solvent with a content of N-unsubstituted or N-substituted 2-pyrrolidone being 3–50% by weight and a content of the ester solvent being not greater than 30% by weight.

7 Claims, No Drawings

FLUX FOR SOLDERING USING SOLDER PREFORMS

BACKGROUND OF THE INVENTION

The present invention relates to a flux for soldering, and particularly to a flux for use in soldering using solder preforms, such as ball solder, washer solder, and pellet solder.

Recently, solder preforms have been used widely in soldering electronic devices. Ball solder, for example, is used to form bumps for ball grid array (BGA) packages, washer solder is used to solder lids of semiconductor packages, and pellet solder is used to fix IC devices to substrates.

When a flux and solder preform are used to carry out soldering, a flux is first applied to a predetermined area of a substrate, a solder preform is then placed on it, and the resulting soldering assembly is conveyed into a heating apparatus such as a reflow furnace wherein soldering is completed.

Conventional fluxes for such use comprise rosin and an activator dissolved in a low melting point solvent (referred to below as a "low melting solvent") such as isopropyl alcohol (IPA) or 2-ethoxy ethanol.

When soldering is carried out using solder performs, the solder preform must never slip off its desired mounting position, and it must never be moved from the mounting position. In the case of soldering of BGA packages, for example, there are several hundred lands on each of which ball solder must be placed. Thus, if one of several hundred pieces of ball solder is removed from its assigned land, the BGA device, after soldering, will not function, and a quite expensive BGA device must be wasted. This is because all the soldering lands must be connected to their own destinations through respective pieces of ball solder.

However, during soldering, solder preforms easily slip off and move from their respective lands, such disadvantage being collectively called "displacement". Especially when soldering is carried out using ball solder in a reflow furnace, displacement of ball solder from the assigned lands takes place frequently. This is because ball solder is round and can easily roll around. In addition, since a substrate on which ball solder has been placed is often inclined and the substrate is sometimes subjected to mechanical shock, during the time when the substrate is transferred to a conveyor passing through the reflow furnace, displacement of ball solder quite easily occurs and is almost inevitable under usual conditions. When the substrate is subjected to vibration, too, such displacement occurs easily.

Furthermore, electronic devices to which soldering with solder preforms is applied must be free from flux residue because flux residue which remains after soldering not only decreases the insulation resistance of these electronic devices but also causes malfunction of the device due to the formation of a corrosion product. Thus, it is necessary to thoroughly wash off flux residue after soldering of these electronic devices.

For this purpose, it was conventional to use cleaners such as Fron (tradename) and trichloroethylene, which can dissolve rosin efficiently, to wash an electronic device or substrate after soldering. However, these cleaners cause serious environmental problems in that they contribute to destroy of the ozone layer as well as to pollution of underground water. Therefore, recently alcohols have been used widely instead of the before-mentioned cleaners, since the use of alcohols does not cause such environmental problems.

Thus, a flux for use in soldering using solder preforms must be washed off with alcohol.

A flux is sometimes stored for a substantial period of time before use. During storage the tackiness of a flux is gradually degraded. If the tackiness can be maintained at constant even after a substantial period of storage time, it would be quite easy to use such cleaners.

In a production line, after application of a flux to a substrate, the substrate is sometimes left overnight without solder preforms being placed on it. For example, when the application of a flux is performed just before the end of working hours and the placement of solder preforms must be put off until the next day, it would be advantageous under these situations for the tackiness of the flux to be maintained until the next day.

Thus, not only must a flux for use in soldering using solder preforms exhibit a strong tackiness, but also such strong tackiness must be maintained for a longer period of time even during storage or after the application of the flux to a substrate, for example.

SUMMARY OF THE INVENTION

As is apparent from the foregoing it is difficult to avoid displacement of solder preforms during soldering with solder preforms. The main cause of displacement is that conventional fluxes exhibit such weak tackiness that the solder preforms which are placed on designated locations on a substrate easily move when the substrate is inclined to any extent, or when mechanical shocks are applied to the substrate in a reflow furnace, or when the substrate is vibrated while being conveyed.

Displacement of solder preforms can also occur in a reflow furnace when conventional fluxes are used because conventional fluxes rapidly slump upon heating to 100–150° C. in a preheating zone of a reflow furnace due to a small rosin content.

It is also a problem that flux residues after soldering with a conventional flux are hard to wash off with an alcohol.

Furthermore, since conventional fluxes degrade in their tackiness as time elapses after the application thereof to a substrate, displacement of a very large number of solder preforms which have been placed on lands of the substrate may occur.

The object of the present invention is to provide a flux composition which can exhibit strong tackiness, which is free from slump upon heating in a reflow furnace, which is easily washable with an alcohol, and which is able to maintain such strong tackiness for an extended period of time.

The inventors of the present invention found that N-unsubstituted or N-substituted 2-pyrrolidone exhibits excellent solubility with respect to rosin as well as excellent compatibility with an alcohol. The inventors also noted that the tackiness of a flux can be maintained even after its application to a substrate if the flux is kept wet.

The present invention, therefore, is a flux composition for use together with solder preforms, which comprises rosin and N-unsubstituted-2-pyrrolidone or N-substituted-2-pyrrolidone with a content of N-unsubstituted-2-pyrrolidone or N-substituted 2-pyrrolidone being 3–50% by weight.

In another aspect, the present invention is a flux composition for use together with solder preforms, which comprises rosin, N-unsubstituted or N-substituted-2-pyrrolidone, and a high boiling point ester solvent (referred to below as a "high boiling solvent", or "high boiling ester solvent") with a content of N-unsubstituted or N-substituted-2-pyrrolidone being 3–50% by weight and a content of the ester solvent being not greater than 30% by weight.

In a preferred embodiment of the present invention, the high boiling ester solvent is at least one selected from the group consisting of a sebacate ester, a phthalate ester, an abietate ester, and a stearate ester.

An oil-soluble dye or pigment in an amount of 0.05–5.0% by weight may be added to the flux composition of the present invention in order to color the location where the flux has been applied. A preferred content is 0.05–1.0% by weight. More specifically, it is 0.1–0.5% by weight.

DESCRIPTION OF THE PREFERRED EMBODIMENTS

According to the present invention, as a solvent for rosin, 3–50% by weight of N-unsubstituted or N-substituted-2-pyrrolidone is added to a rosin-containing flux for use in soldering using solder preforms.

The tackiness of a flux is determined by its rosin content. The higher the rosin content the greater the tackiness of a flux.

In order to maintain a certain level of tackiness which is sufficient to keep solder preforms in place, at least 50% by weight of rosin is added. However, conventional solvents such as IPA and 2-ethoxydiethanol can only dissolve up to 50% by weight of rosin. In contrast, N-unsubstituted or N-substituted-2-pyrrolidone can dissolve 50% by weight or more of rosin.

N-unsubstituted or N-substituted-2-pyrrolidone (referred to merely as "pyrrolidone" hereunder) can be shown by the following general formula:

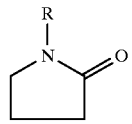

wherein R: hydrogen, alkyl groups having 1–10 carbon atoms, or phenyl groups, preferably R: lower alkyl groups having 1–4 carbon atoms.

Since pyrrolindone has a relatively low toxicity, it is compatible with alcohol, and it is free from bumping during heating due to its high boiling point properties, pyrrolidone is advantageous as a flux for soldering.

A flux of the present invention comprises 3–50% by weight of pyrrolidone. When the pyrrolidone content is less than 3% by weight, it is impossible to dissolve a large amount of rosin. On the other hand, when the pyrrolidone content is over 50% by weight, the rosin content decreases accordingly, resulting in a less tacky flux. A preferable content of pyrrolidone is 5–40% by weight with a more preferable content being 5–20% by weight.

A flux of the present invention may further comprise a high boiling ester solvent in an amount of 30% by weight or less.

According to the present invention it is possible to maintain a desired level of tackiness by adding only pyrrolidone.

However, when the solvent is added in an amount of over 30% by weight, the presence of such a large amount of solvent does act adversely on the dissolution of rosin into pyrrolidone. A preferable content of the high boiling ester solvent is 20% by weight or less. Although there is no specific lower limit on the solvent content, usually the addition of such a solvent in an amount of 10% by weight or more is effective for the purpose of the present invention.

The high boiling ester solvent used in the present invention is a solvent having a boiling point higher than the melting point of solder, i.e., 200° C., and is not restricted to a specific one so long as it has such a boiling point.

In a preferred embodiment of the present invention the high boiling ester solvent is at least one selected from the group consisting of sebacate esters, phthalate esters, abietate esters, and stearate esters.

These esters are less toxic than IPA and have excellent compatibility with alcohol.

In a further preferred embodiment of the present invention, dyes such as 1,4-butylamine-anthraquinone (blue), isoindolinones (green), quinacridones (red), phthalocyanine blue (blue), and soluble azo pigments may be combined with the flux composition of the present invention to color the places where the flux has been applied. After application of the flux it is easy to determine by visual observation or image processing how successfully the application of flux has been.

The flux of the present invention may further comprise an activator, diethanolamine HBr, adipic acid, , and the like as an optional element. Usually the total content of such additives will be restricted to 3% by weight or less.

Some examples of a preferred flux composition of the present invention are listed below, in which % refers to % by weight.

Flux Composition I:
　N-unsubstituted or N-substituted-2-pyrrolidone: 3–50%
　Rosin: Balance
Flux Composition II:
　N-unsubstituted or N-substituted-2-pyrrolidone: 3–50%
　Activator (Amines): 1.0% or less
　Rosin: Balance
Flux Composition III:
　N-unsubstituted or N-substituted-2-pyrrolidone: 3–50%
　High Melting Ester Solvent: 30% or less
　Rosin: Balance
Flux Composition IV:
　N-unsubstituted or N-substituted-2-pyrrolidone: 3–50%
　High Melting Ester Solvent: 30% or less
　Activator (Amines): 1.0% or less
　Rosin: Balance
Flux Composition V:
　N-unsubstituted or N-substituted-2-pyrrolidone: 3–50%
　High Melting Ester Solvent: 30% or less
　Activator (Amines): 1.0% or less
　Dye: 0.1–0.5%
　Rosin: Balance The present invention will be described in further detail in conjunction with working examples, which are presented merely for illustrative purposes and do not restrict the present invention in any way.

EXAMPLES

Fluxes having the compositions shown in Table 1 were prepared and subjected to a falling-off test, a displacement test, and a cleaning test.

Test results for working examples of the present invention and for comparative examples are summarized in Table 1.

Test Piece:

A substrate for a PGA (pin grid array) package having a thickness of 0.8 mm, planar dimensions of 50×50 mm, and 576 lands each having a diameter of a land of 0.6 mm was used.

Falling-off Test:

(i) Flux was applied to a BGA substrate with a dispenser, and solder preforms, i.e., ball solder was placed on each of the lands. Immediately after placement of the ball solder, the substrate was turned over and the number of lands from which the ball solder fell was counted. When the number was zero, the test results were evaluated as "excellent". When the number was 1–10, the test results were evaluated as "good". When the number was more than 10, they are evaluated as "poor". These test results are shown in the column labeled "Immediate".

Thus, a flux according to the present invention exhibits an improved level of tackiness so that the displacement of ball solder does not occur after its placement on a substrate even when the substrate is inclined, subjected to shocks, or vibrated to an extent usually encountered in a production line, and even when the substrate is heated in a reflow furnace. The flux of the present invention can ensure that every piece of ball solder remains on its designated land. In addition, the flux of the present invention exhibits excellent compatibility with alcohol, resulting in a high level of reliability of a substrate after cleaning. Furthermore, the flux of the present invention can maintain its tackiness for an extended period of time so that great flexibility with respect to manufacturing operations can be achieved. These advantages of the present invention have not yet been known in the prior art.

TABLE 1

| | High Boiling Solvent | | Low Boiling Solvent | | Activator | | (Composition: % by weight) | | | |
| | | | | | | | Falling-Off Test | | | Cleaning |
| | N-methyl-2-pyrrolidone | Dibutyl sebacate | Diethyl phthalate | IPA | 2-ethoxy-ethanol | Diethanol-amine HBr | Rosin | Immediate | After 12 hours | Displacement Test | test Alcohol |
|---|---|---|---|---|---|---|---|---|---|---|---|
| Example 1 | 20 | — | — | — | — | 0.1 | Bal. | Excellent | Good | Good | Good |
| Example 2 | 20 | — | — | — | — | 0.1 | Bal. | Good | Good | Good | Good |
| Example 3 | 20 | 20 | — | — | — | 0.1 | Bal. | Excellent | Excellent | Excellent | Excellent |
| Example 4 | 20 | — | 20 | — | — | 0.1 | Bal. | Excellent | Excellent | Excellent | Excellent |
| Comparative 1 | — | — | — | 50 | — | 0.1 | Bal. | Poor | Poor | Poor | Poor |
| Comparative 2 | — | — | — | — | 50 | 0.1 | Bal. | Poor | Poor | Poor | Good |

(ii) Flux was applied to a BGA substrate with a dispenser, and solder preforms, i.e., ball solder was placed on each of the lands 12 hours after the application of the flux to the substrate. After the placement of the ball solder, the substrate was turned over and the number of lands from which the ball solder fell was counted. Evaluation of the results was the same as described in Paragraph (i) above.

These test results are shown in the column labeled "After 12 hours".

Displacement Test:

Flux was applied to a BGA substrate with a dispenser, and solder preforms, i.e., ball solder was placed on each of the lands immediately after the application of the flux to the substrate. The substrate was then heated in a reflow furnace. The number of pieces of ball solder which were displaced from their initial positions during heating within the reflow furnace was determined. When the number of displaced pieces of ball solder was zero, the test result was evaluated as "excellent". When the number was 1–10, it was evaluated as "good". When the number increased to larger than 10, it was evaluated as "poor".

Cleaning Test:

A test piece which has been subjected to the displacement test was immersed in an alcohol solution for 5 minutes. After immersion the state of flux residues was observed.

When the flux residue was washed off completely, the test result was evaluated as "excellent". When a very slight amount of flux residue remained it was evaluated as "good". When a large amount of flux residue remained, it was evaluated as "poor".

What is claimed is:

1. A flux composition for use together with solder preforms, consisting essentially of rosin and N-unsubstituted or N-substituted 2-pyrrolidone, with a content of N-unsubstituted or N-substituted 2-pyrrolidone being 3–50% by weight.

2. A flux for use together with solder preforms consisting essentially of rosin, N-unsubstituted or N-substituted 2-pyrrolidone, and a color dye, with a content of N-unsubstituted or N-substituted 2-pyrrolidone of 3–50% by weight and a content of color dye in an amount of 0.05 to 5.0% by weight.

3. A flux composition for use together with solder preforms, consisting essentially of rosin, N-unsubstituted or N-substituted 2-pyrrolidone, and a high boiling point ester solvent, with a content of N-unsubstituted or N-substituted 2-pyrrolidone being 3–50% by weight and a content of the ester solvent being not greater than 30% by weight.

4. A flux as set forth in claim 3 for use together with solder preforms consisting essentially of rosin, N-unsubstituted or N-substituted 2-pyrrolidone, and a color dye, with a content of N-unsubstituted or N-substituted 2-pyrrolidone of 3–50% by weight and a content of color dye in an amount of 0.05 to 5.0% by weight.

5. A flux as set forth in claim 3 wherein the high boiling ester solvent is one or more selected from the group consisting of sebacate esters, phthalate esters, abietate esters, and stearate esters.

6. A flux as set forth in claim 1 wherein the solder preform is selected from ball solder, washer solder, and pellet solder.

7. A flux as set forth in claim 3 wherein the solder preform is selected from ball solder, washer solder, and pellet solder.

* * * * *